United States Patent
Moredock et al.

(10) Patent No.: US 7,056,368 B2
(45) Date of Patent: Jun. 6, 2006

(54) POWERED AIR CLEANING SYSTEM AND AIR CLEANING METHOD

(75) Inventors: James G. Moredock, Jacksonville, FL (US); Eric L. Ehrenberg, Jacksonville, FL (US)

(73) Assignee: Sy-Klone Company, Inc., Jacksonville, FL (US)

( * ) Notice: Subject to any disclaimer, the term of this patent is extended or adjusted under 35 U.S.C. 154(b) by 70 days.

(21) Appl. No.: 10/484,468

(22) PCT Filed: Oct. 18, 2002

(86) PCT No.: PCT/US02/33220

§ 371 (c)(1),
(2), (4) Date: Jan. 22, 2004

(87) PCT Pub. No.: WO03/033107

PCT Pub. Date: Apr. 24, 2003

(65) Prior Publication Data

US 2004/0231515 A1   Nov. 25, 2004

Related U.S. Application Data

(60) Provisional application No. 60/329,748, filed on Oct. 18, 2001.

(51) Int. Cl.
*B01D 45/12* (2006.01)
(52) U.S. Cl. .............. 95/269; 95/270; 55/385.3; 55/396; 55/401; 55/438; 55/457; 55/392; 55/394
(58) Field of Classification Search ............ 95/269, 95/270; 55/337, 385.3, 396, 401, 438, 457, 55/269, 270, 392, 394
See application file for complete search history.

(56) References Cited

U.S. PATENT DOCUMENTS

| 4,048,911 | A  |    | 9/1977  | Petersen |
|-----------|----|----|---------|----------|
| 5,656,050 | A  |    | 8/1997  | Moredock |
| 5,766,315 | A  |    | 6/1998  | Moredock |
| 6,319,304 | B1 | *  | 11/2001 | Moredock ............ 95/269 |
| 6,338,745 | B1 |    | 1/2002  | Moredock et al. |
| 6,406,506 | B1 |    | 6/2002  | Moredock et al. |
| 6,425,943 | B1 |    | 7/2002  | Moredock |

\* cited by examiner

OTHER PUBLICATIONS

International Search Report; PCT/US02/33220; Oct. 18, 2002.

*Primary Examiner*—Minh-Chau T. Pham
(74) *Attorney, Agent, or Firm*—Antonelli, Terry, Stout and Kraus, LLP.

(57) ABSTRACT

A powered air cleaning system (1) and air cleaning method are disclosed. The system has a flow path (22) extending through the system from an air inlet (4) to a clean air outlet (5). A motor-driven fan (24) located along the flow path draws particulate debris laden air into the inlet and rotates it about an axis (A—A) to form a rotating flow that stratifies the debris laden air with the heaviest particles in the outermost orbits of the rotating flow. An ejector port (25) is provided for ejecting particulate debris laden air from the stratified rotating flow in the system to the environment. An air filter (9) located within the rotating flow and across the flow path upstream of the outlet filters air from the innermost orbits of the stratified rotating flow. The motor-driven fan is operated to maintain a positive air pressure in the system on the filter even with cyclic air flow demands so that the rotating air flow continually sweeps the outside surface of the air filter to minimize buildup of debris on the filter.

22 Claims, 6 Drawing Sheets

POWERED AIR CLEANING SYSTEM AND AIR CLEANING METHOD

RELATED APPLICATIONS

This application is a U.S. national filing under 35 U.S.C. §371 of international application PCT/US02/33220 filed Oct. 18, 2002, which claims priority of U.S. application Ser. No. 60/329,748 filed Oct. 18, 2001.

TECHNICAL FIELD

The present invention is directed to an improved powered, atmospheric ejective, air cleaning system and air cleaning method for efficiently removing debris from debris laden air to supply clean air to a device with which the system is used. For example, the invention is useful in connection with total air flow applications such as ventilation systems, as a fixed air flow provider for heat exchangers and heating and air conditioning systems, and with devices having a variable air flow demand, particularly internal combustion engines which exert a variable vacuum on their air intake to be supplied with clean air.

BACKGROUND AND SUMMARY

Air intakes that centrifugally separate heavier-than-air particles from the air to be used in internal combustion engines, ventilation systems, and other apparatus that draw in air laden with debris, are known. The use of in-line filters in air delivery systems to clean the air is also, per se, known. However, air filters are subject to plugging by debris from the air passing through the filter, which eventually increases the restriction to air flow through the filter and decreases the operating performance of an associated device, such as an electronically controlled internal combustion engine being supplied with air through the filter. Frequent filter replacement and shorter service intervals may also be required, which increases the cost of operation. There is a need for an improved air cleaning system and air cleaning method which combine centrifugal separation and air filtration in a manner to efficiently remove debris from debris laden air while reducing or avoiding the aforementioned problems.

A powered air cleaning system according to the invention comprises a flow path extending through the system from an air inlet to a clean air outlet. A motor-driven fan is located along the flow path to draw particulate debris laden air into the inlet and rotate it about an axis to form a rotating flow that stratifies the debris laden air with the heaviest particles in the outermost orbits of the rotating flow. An ejector port is provided for ejecting particulate debris laden air from the stratified rotating flow in the system to the environment. An air filter is located within the rotating flow and across the flow path upstream of the clean air outlet for filtering air from the innermost orbits of the stratified rotating flow. According to the disclosed example embodiment of this invention, the filter is elongated in the direction of the axis about which the debris laden air is rotated. An outer peripheral surface of the filter within the rotating flow is swept by innermost orbits of the stratified rotating flow for minimizing debris buildup on the filter.

An air cleaning method of the invention comprises drawing particulate debris laden air into the air cleaning system with the motor-driven fan located in the system, forming a rotating flow of the debris laden air in the system to stratify the flow with the heaviest particles in the outermost orbits of the rotating flow, flowing air from the innermost orbits of the rotating flow through the filter enroute to the outlet of the system, and returning particulate debris laden air from the stratified rotating flow in the system to the environment. According to the example embodiment air is supplied to a device with a variable air flow demand, which applies a variable vacuum to the outlet of the air cleaning system, and the method further includes operating the motor-driven fan to maintain positive air flow pressure in the system to return particulate debris laden air to the environment from the system at all rates of air flow demand by the device. The positive air flow pressure, acting on the filter of the system located within the rotating flow, keeps debris buildup on the filter to a minimum. Accordingly, the system self-cleans its air filter.

These and other features and advantages of the present invention will become more apparent from the following description when taken in connection with the accompanying drawings, which show, for purposes of illustration only, one preferred embodiment in accordance with the present invention.

BEST MODE FOR CARRYING OUT THE INVENTION

Figure 1:
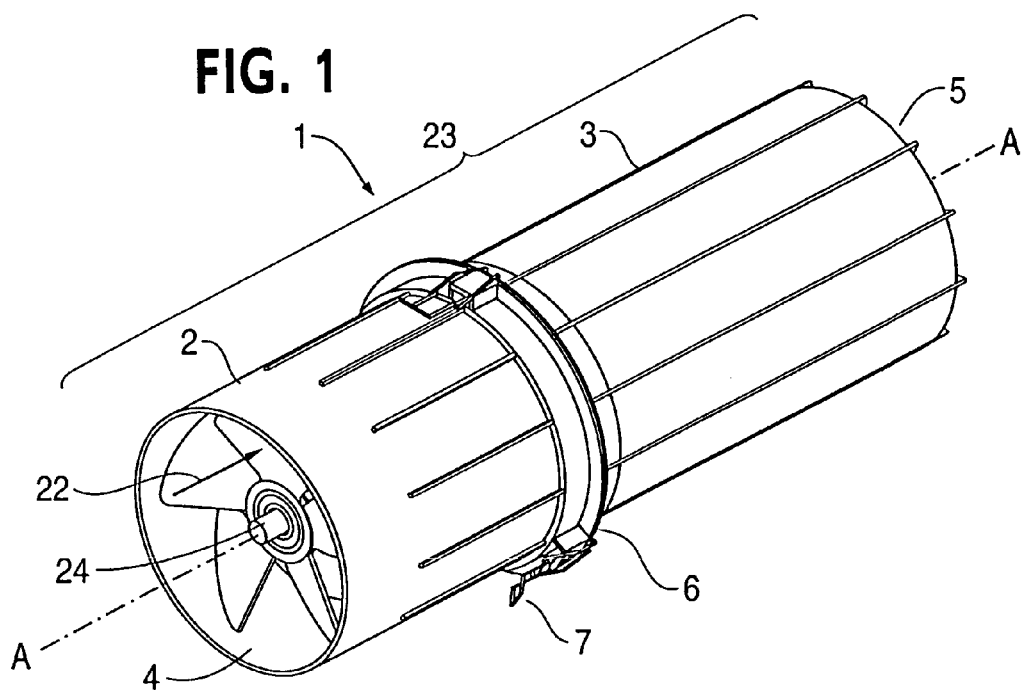
FIG. 1 is a perspective view from the front, inlet end, and to one side, of a powered air cleaning system/apparatus according to one, preferred embodiment of the present invention.
Figure 2:
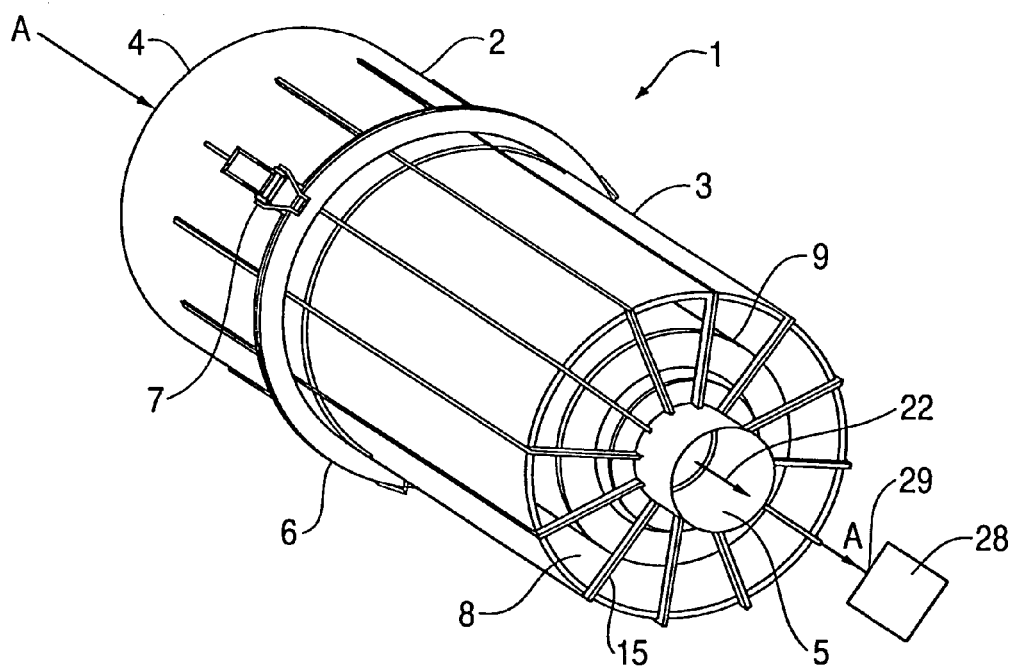
FIG. 2 is a perspective view from the back, outlet end, and to one side, of the air cleaning system of FIG. 1, shown, schematically, connected to an air intake of a device with a variable air flow demand.
Figure 3:
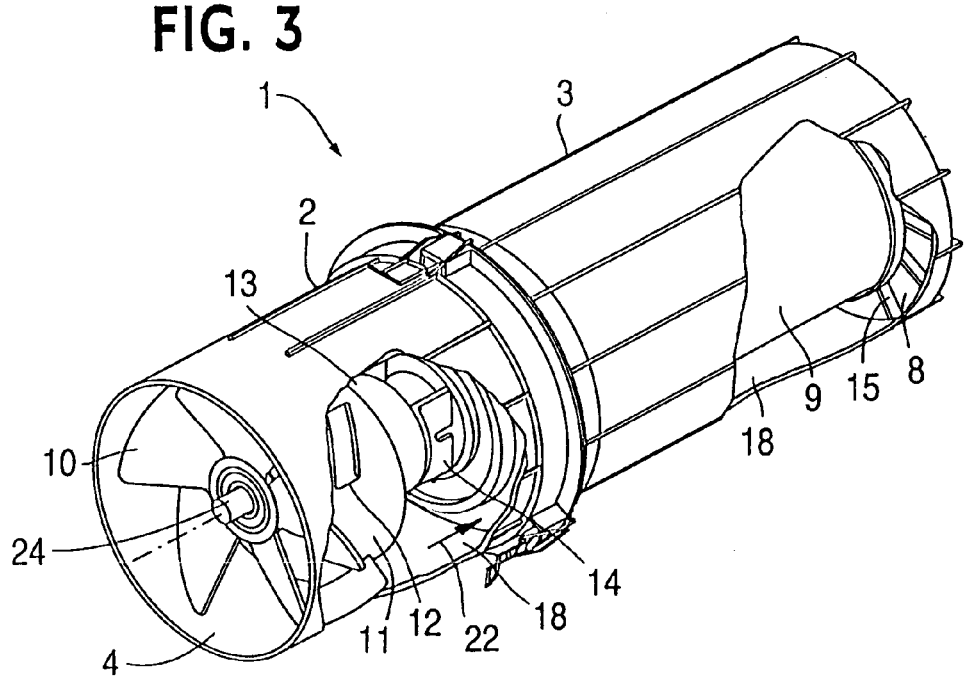
FIG. 3 is a view of the system similar to FIG. 1 with portions of the housing cut away to show components within the housing.
Figure 4:
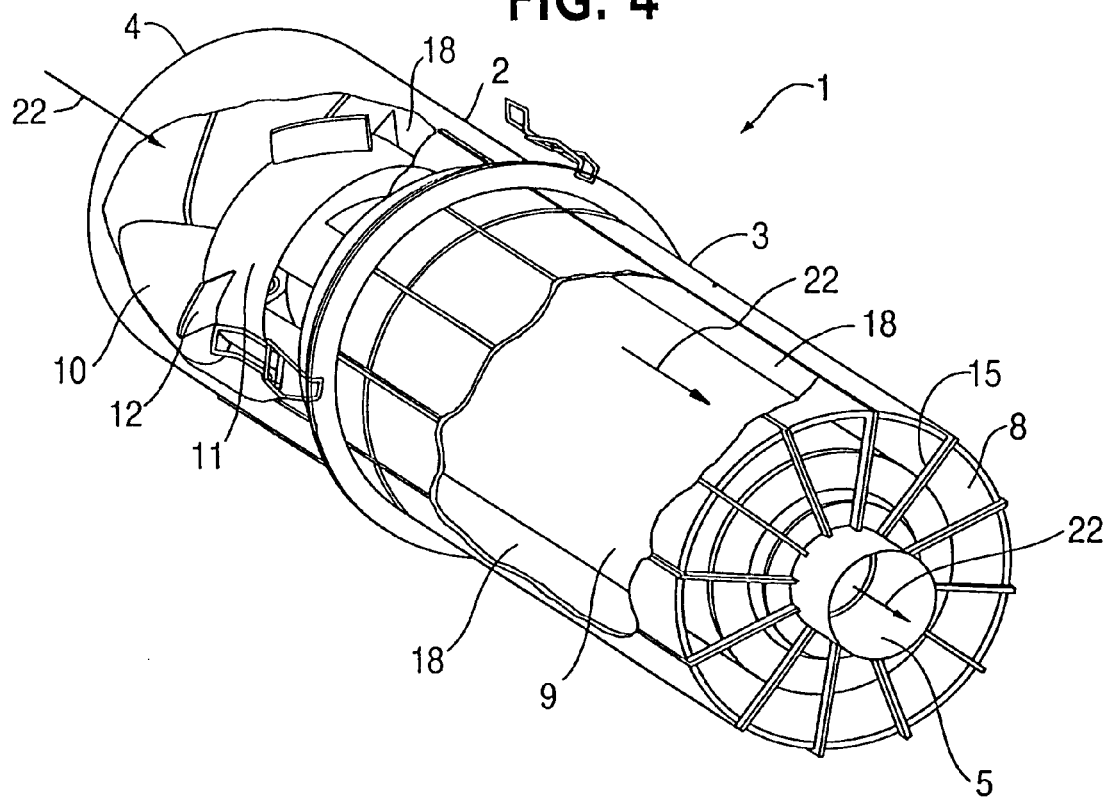
FIG. 4 is a view of the system similar to FIG. 2 with portions of the housing cut away to depict components inside the housing.
Figure 5:
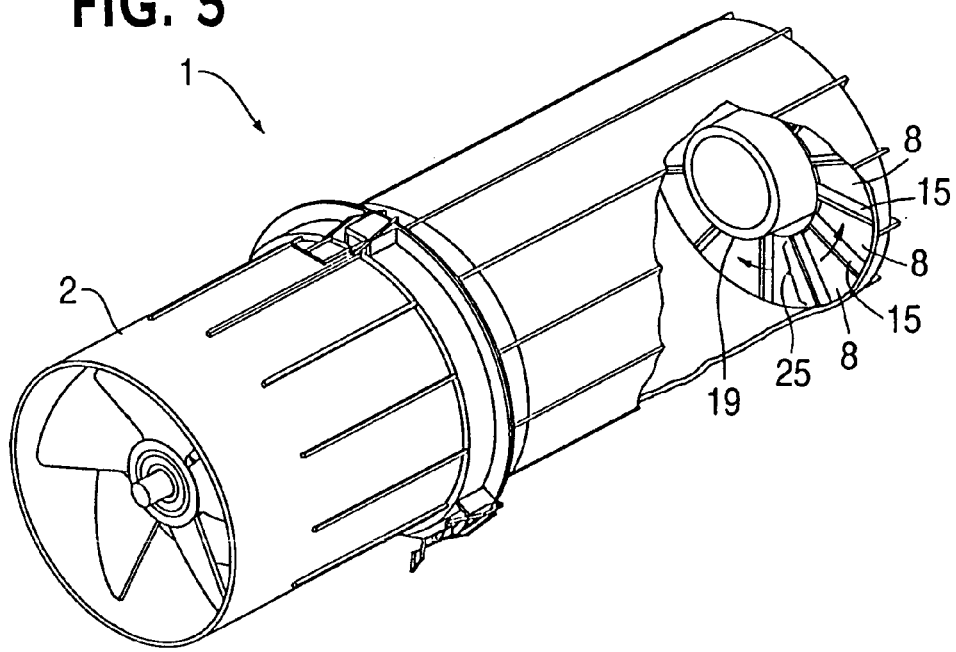
FIG. 5 is a view of the system like FIG. 1 except with a portion of the housing removed and with the filter in the system removed to show the clean air outlet orifice through the back, outlet end of the housing.
Figure 6:
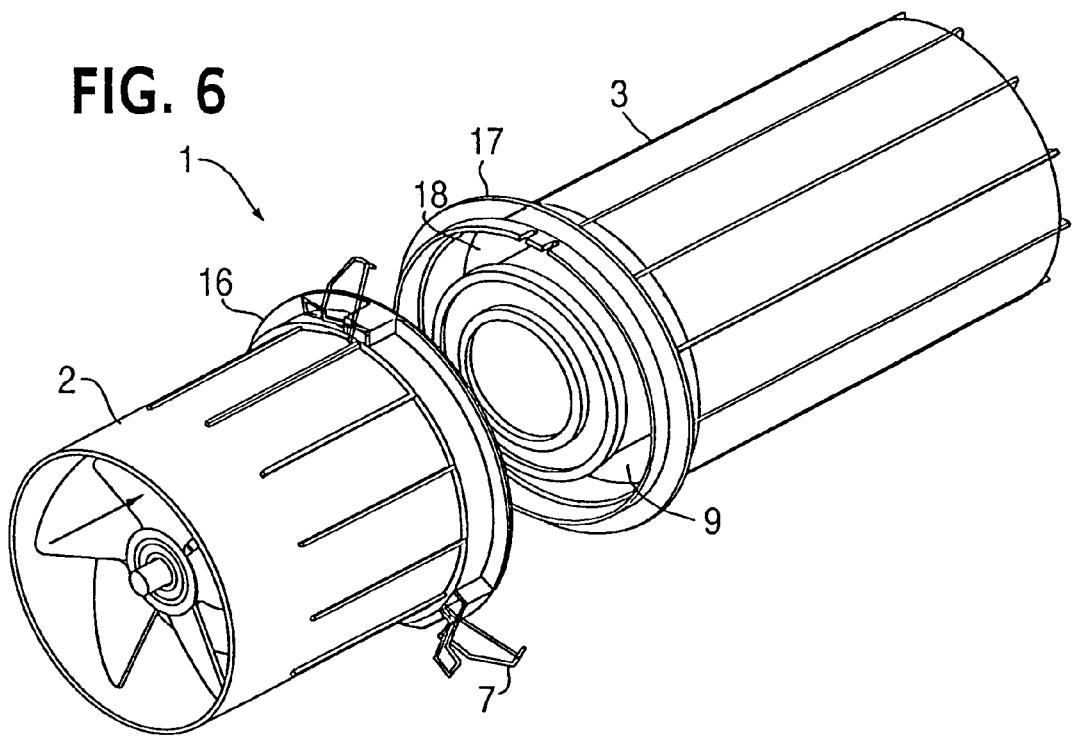
FIG. 6 is a perspective view of the system like FIG. 1 but with the detachable motorized fan housing and filter housing forming the system housing being separated from one another.
Figure 7:
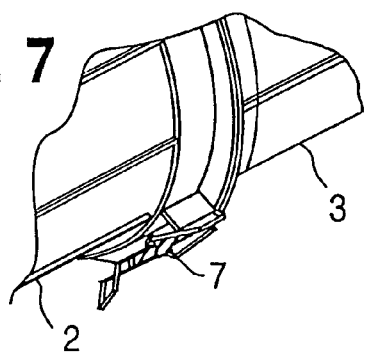
FIG. 7 is a detailed view of a portion of the joined detachable motorized fan housing and filter housing having a removable joining clip thereof as shown in FIG. 5.
Figure 8:
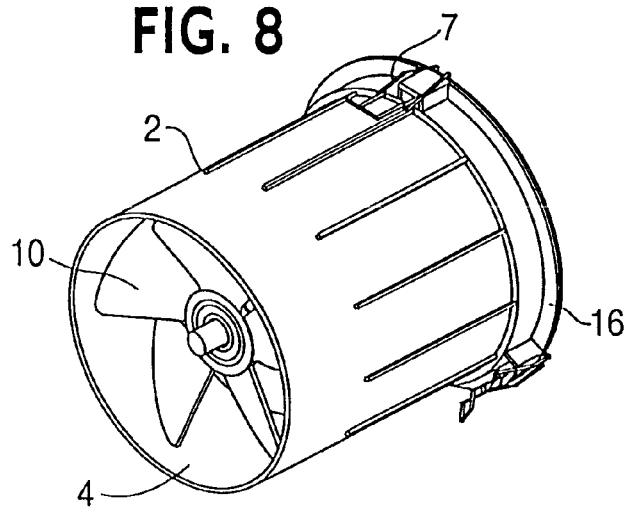
FIG. 8 is a perspective view from the front, inlet end, and to one side, of the detachable motorized fan housing of the system of FIG. 1.
Figure 9:
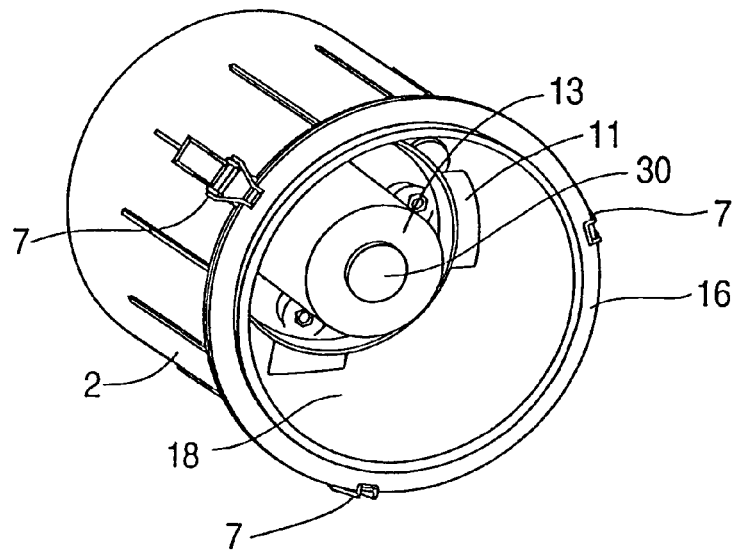
FIG. 9 is a perspective view from the back, outlet end of the detachable motorized fan housing system of FIG. 1.

Referring now to the drawings, a powered air cleaning system or apparatus 1, FIGS. 1–6, according to the example embodiment is shown connected to the air intake 29 of a device 28, such as an internal combustion engine or other device requiring a supply of clean air, as shown schematically in FIG. 2. The system comprises a flow path 22 extending through the system from an air inlet 4 to a clean air outlet 5 which supplies clean air to the air intake 29 of device 28. The flow path is located within a generally cylindrical housing 23 of the system. Housing 23 is formed by two detachable components—motorized fan housing 2 and filter housing 3 which are detachably connected to one another at a service flange assembly 6 by joining clips 7, see FIG. 7. For this purpose each of the housings 2 and 3 has a joining flange, 16 and 17, respectively. The housings 2 and 3 are shown detached from one another in FIG. 6 and shown separately in FIGS. 8 and 9, and 12 and 13, respectively.

A motor-driven fan 24, comprising a fan blade 10 mounted on the output shaft of an electric motor 13, is located along the flow path 22 to draw particulate debris laden air into the inlet 4 and rotate it about an axis A—A to form a rotating flow in the system that stratifies the debris laden air with the heaviest particles in the outermost orbits of the rotating flow. A compression assembly 11 in the form of an angled louver/motor mount assembly with fixed louvers or vanes 12 is located within the fan housing 2 downstream of the fan blade 10. The compression assembly compresses the volume of the rotating flow of debris laden air drawn into the system inlet to increase the air velocity and centrifugal force acting on the airborne articles. The motor-driven fan 24 is supported at motor 13 thereof within the fan housing by way of the angle louver/motor mount assembly 11 as seen in FIGS. 3, 4, 8 and 9.

A separator-ejector chamber 18 is provided in the flow path of the air cleaning system downstream of the angled louver/motor mount assembly, FIGS. 3–6, 9 and 15. The outermost orbits of the rotating flow pattern of debris laden air ride on the outer wall 27 of the separator-ejector chamber until reaching an annular ejector port 25 formed about the outlet 5 in the outlet end of the housing radially outward of the clean air outlet. The ejector port is formed by a series of circumferential radial ejection slots 8 separated by strakes 15. The ejector port ejects particulate debris laden air from the stratified rotating flow in the system to the environment.

Figure 10:
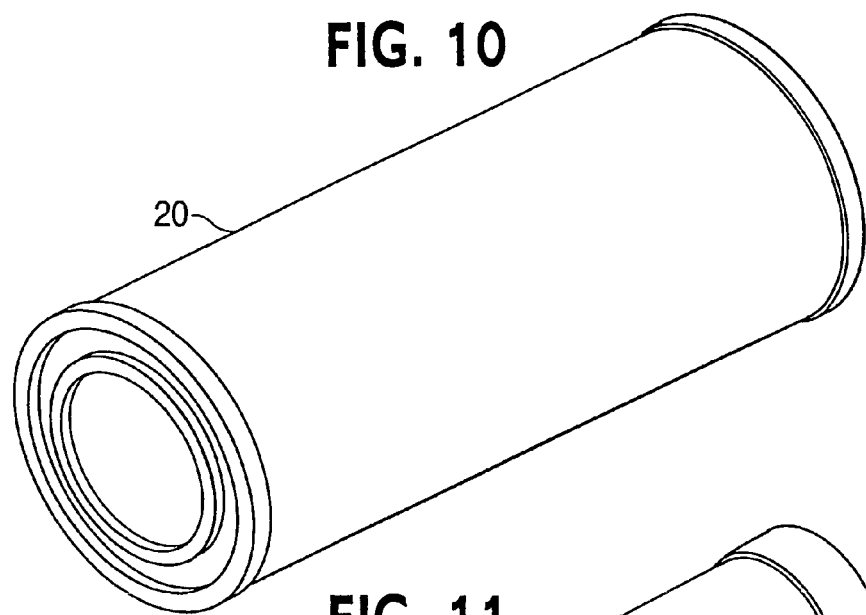
FIG. 10 is a perspective view of a main primary air filer element used in the system of FIG. 1.
Figure 11:
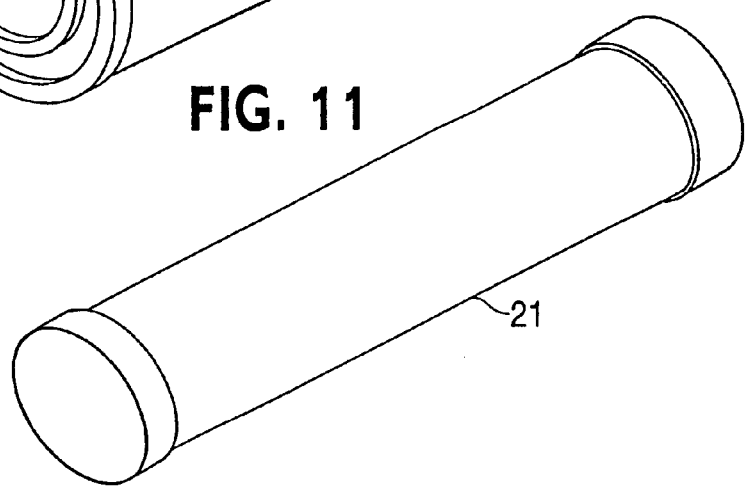
FIG. 11 is a perspective view of a secondary safety air filter element optionally used in the system of FIG. 1 inside of the main primary air filter element.
Figure 12:
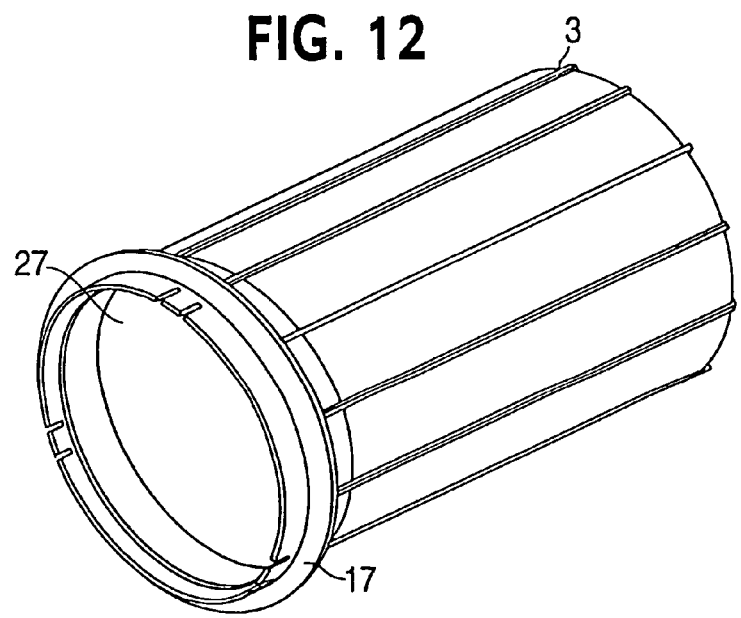
FIG. 12 is a perspective view of the filter housing from the front end with no filter installed therein.
Figure 13:
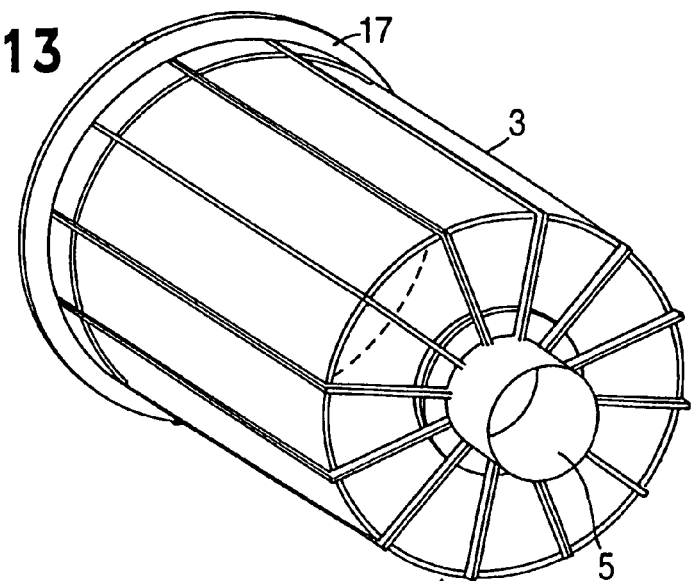
FIG. 13 is a perspective view of the filter housing from the back, outlet end thereof with no filter installed.
Figure 14:
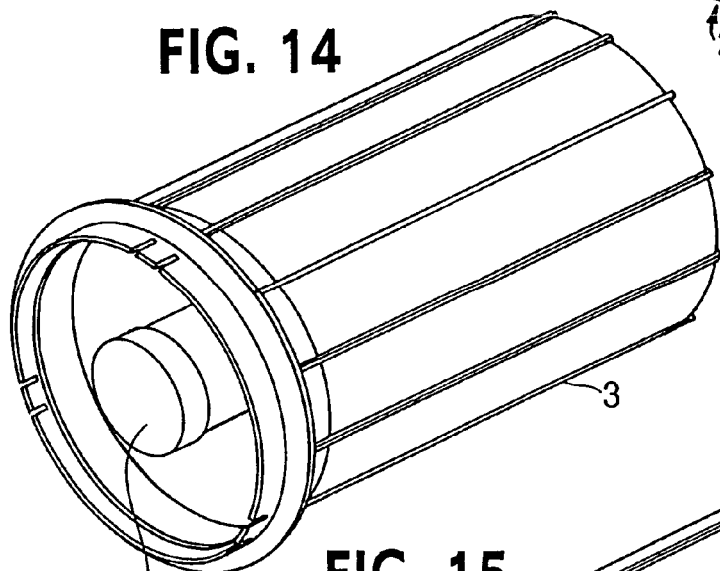
FIG. 14 is a perspective view of the filter housing like FIG. 12 but with the optional safety filter installed.
Figure 15:
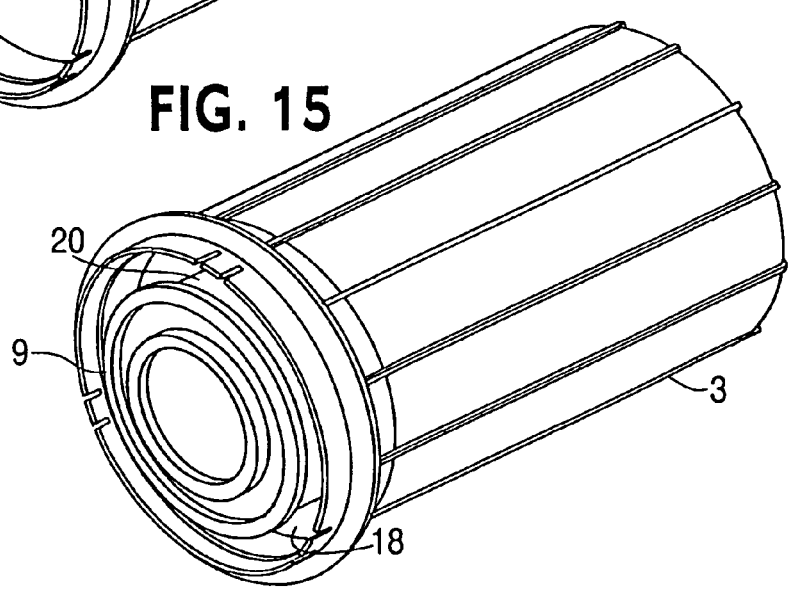
FIG. 15 is a perspective view of the filter housing like FIG. 13 but with the main filter shown installed therein.

An air filter 9, FIGS. 2–4, 6 and 15, in the form of a filter package of at least a main primary air filter element 20, FIGS. 10 and 15, and optionally a secondary safety air filter element 21, FIGS. 11 and 14, located within the filter element 20, is located within the rotating flow and across the flow path upstream of the outlet for filtering air from the innermost orbits of the stratified rotating flow in the system as the air flows to the clean air outlet 5. The filter 9 is elongated in the direction of and extends along the central longitudinal axis A—A of the generally cylindrical housing 23 in the separator-ejector chamber from the outlet end, where it is mounted on clean air outlet orifice 19, FIG. 5. The upstream end of the filter 9 is supported by a filter compression bracket 14 connected to a support flange 30, FIG. 9, on the end of motor 13.

Debris buildup on the outer surface of the filter 9 is minimized by locating the filter within the rotating flow of the debris laden air in the separator-ejector chamber 18 and by returning particulate debris laden air from the stratified rotating flow in chamber 18 unrestricted through the ejector port 25 at the end of the chamber, e.g., without disrupting the stratified rotating flow in the chamber. The self cleaning action on the filter 9 has also been found to be enhanced, in supplying air to the air intake 29 of a device 28 having a cyclic air flow demand, such as an internal combustion engine which applies a variable vacuum to the outlet 5 of the system, by operating the motor-driven fan to maintain positive air flow pressure on the outer surface of the filter and to return debris laden air to the environment from the system at all rates of air flow demanded by the device. The air cleaning system 1 is designed to generate a much larger air flow than the engine or apparatus 28 upon which it is installed requires, thereby providing a consistent positive air flow pressure to the filter keeping debris buildup on the air filter to a minimum and providing a powerful air flow out of the 360° ejection port 25 formed by the series of radial ejection slots 8 located at the end of the separator-ejector chamber.

The air cleaning system and air cleaning method of the invention make it possible to maintain low air filter restriction throughout normal service intervals for internal combustion engines and other apparatus by significantly extending air filter life over current service intervals. While the air cleaning system and air cleaning method have been described specifically for use in supplying clean air to an internal combustion engine, the invention is not limited to such a use but has wide application for a variety of devices requiring a supply of clean air including ventilation systems, heat exchangers, air compressors, and heating and air conditioning systems.

While we have shown and described only one embodiment in accordance with the present invention, it is understood that the same is not limited thereto, but is susceptible to numerous changes and modifications as known to the skilled in the art. For example, the powered air cleaning system of the invention can be used without the air filter 9 to supply air to a device where centrifugal separation of debris from debris laden air and withdrawal of air from the innermost orbits of the rotating flow in the system by a vacuum from the device at the outlet of the system provides satisfactory cleaning. In this regard, it is noted that the positive pressure in the device maintains flow through the ejector port of the system while the pressure at the clean air outlet remains essentially neutral, with or without air filter 9. The device draws clean air from the clean air outlet in accordance with its demand, e.g., vacuum pull applied to the clean air outlet of the system. Therefore, we do not wish to be limited to the details shown and described herein, but instead to cover all such changes and modifications as are encompassed by the scope of the appended claims.

What is claimed is:

1. A powered air cleaning system comprising:
   a flow path extending through the system from an inlet to an outlet;
   a motor-driven fan located along the flow path to draw particulate debris laden air into the inlet and rotate it about an axis to form a rotating flow that stratifies the debris laden air with the heaviest particles in the outermost orbits of the rotating flow;
   an ejector port for ejecting particulate debris laden air from the stratified rotating flow in the system to the environment; and
   an air filter located within the rotating flow and across the flow path upstream of the ejector port and the outlet for filtering air from the innermost orbits of the stratified rotating flow, the air filter being elongated in the direction of said axis so that the rotating flow about the filter causes a self cleaning action on the filter.

2. The air cleaning system according to claim 1, wherein an outer peripheral surface of the elongated filter is cylindrical.

3. The air cleaning system according to claim 1, further comprising a compression assembly for compressing the volume of the rotating flow of debris laden air to increase the air velocity and centrifugal force acting on the airborne particles.

4. The air cleaning system according to claim 3, wherein the compression assembly provides support for the motor-driven fan.

5. The air cleaning system according to claim 3, wherein the compression assembly includes a plurality of stationary vanes in the flow path.

6. The air cleaning system according to claim 3, further comprising a separator-ejector chamber in the flow path downstream of the compression assembly, the outermost orbits of the rotating flow riding on an outer wall of the separator-ejector chamber until reaching said ejector port.

7. The air cleaning system according to claim 6, wherein said filter is located centrally within said separator-ejector chamber.

8. The air cleaning system according to claim 1, further comprising a generally cylindrical housing, said inlet and said outlet being arranged at respective ends of said housing and said flow path extending through housing.

9. The air cleaning system according to claim 8, wherein said ejector port is arranged in the outlet end of the housing radially outward from said outlet.

10. The air cleaning system according to claim 8, wherein said filter extends along a central longitudinal axis of the generally cylindrical housing from the outlet end thereof.

11. The air cleaning system according to claim 10, further comprising a bracket for supporting within the housing an end of the filter remote from the outlet end of the housing.

12. A powered air cleaning system for use with a device having a variable air flow demand, the system comprising:
a flow path extending through the system from an inlet to an outlet for supplying air to the device;
a motor-driven fan located along the flow path to draw particulate debris laden air into the inlet and rotate it about an axis to form a rotating flow that stratifies the debris laden air with the heaviest particles in the outermost orbits of the rotating flow;
an ejector port for ejecting particulate debris laden air from the stratified rotating flow in the system to the environment;
an air filter located within the rotating flow and across the flow path upstream of the ejector port and the outlet for filtering air from the innermost orbits of the stratified rotating flow, the air filter being elongated in the direction of said axis so that the rotating flow about the filter causes a self cleaning action on the filter;
wherein the motor-driven fan is operable to maintain positive air flow pressure to eject debris laden air from the stratified rotating flow in the system to the environment at all rates of air flow demanded by the device.

13. A powered air cleaning system for use with a device having a variable air flow demand, the system comprising:
a flow path extending through the system from an inlet to an outlet for supplying air to the device;
a motor-driven fan located along the flow path to draw particulate debris laden air into the inlet and rotate it about an axis to form a rotating flow that stratifies the debris laden air with the heaviest particles in the outermost orbits of the rotating flow;
an ejector port for ejecting particulate debris laden air from the stratified rotating flow in the system to the environment;
an air filter located within the rotating flow and across the flow path upstream of the ejector port and the outlet for filtering air from the innermost orbits of the stratified rotating flow, the air filter being elongated in the direction of said axis so that the rotating flow about the filter causes a self cleaning action on the filter;
wherein the motor-driven fan is operable to maintain positive air flow pressure at all rates of air flow demand by the device to minimize debris buildup on the filter.

14. The air cleaning system according to claim 13, wherein the device with a variable air flow demand is an internal combustion engine which exerts a variable vacuum on the outlet of the system by way of the air intake of the engine.

15. An air cleaning method comprising:
drawing particulate debris laden air into an air cleaning system with a motor-driven fan located in the system;
forming a rotating flow of the debris laden air about an axis in a separator-ejector chamber of the system to stratify the flow with the heaviest particles in the outermost orbits of the rotating flow;
flowing air from the innermost orbits of the rotating flow through a filter in the separator-ejector chamber which is located within the rotating flow and extends along said axis such that the flowing air provides a self cleaning action on the filter by the air enroute to an outlet of the system; and
returning particulate debris laden air from the stratified rotating flow in the system to the environment.

16. The method according to claim 15, wherein said returning is performed without disrupting the stratified rotating flow in the system separator-ejector chamber.

17. The method according to claim 16, wherein said returning includes flowing stratified rotating flow unrestricted through an ejector port of the system to the environment.

18. The method according to claim 15 for use in supplying air to a device with a variable air flow demand which applies a variable vacuum to the outlet of the air cleaning system, the method further including operating the motor-driven fan to maintain positive air flow pressure to return particulate debris laden air to the environment from the system at all rates of air flow demand by the device to allow buildup of debris on the filter to be removed at least during low rates of air flow demand.

19. The method according to claim 18, wherein the device is an internal combustion engine which is supplied air from the outlet of the system.

20. An air cleaning method comprising:
drawing particulate debris laden air into an air cleaning system with a motor-driven fan located in the system;
forming a rotating flow of the debris laden air about an axis in the system to stratify the flow by centrifugal force with the heaviest particles in the outermost orbits of the rotating flow;
returning particulate debris laden air from the stratified rotating flow in the system to the environment by flowing stratified rotating flow unrestricted through an ejector port at an axial end of the stratified rotating flow in the system; and
withdrawing air from the innermost orbits of the stratified rotating flow radially inward through a filter within the stratified rotating flow upstream of the ejector port and an outlet of the system by applying a vacuum to the outlet.

21. The method according to claim 20, including operating the motor-driven fan to maintain positive air flow pressure to return particulate debris laden air to the environment from the system at all rates of withdrawal of air through the outlet of the system.

22. The method according to claim 20, wherein said returning includes flowing said stratified rotating flow unrestricted through said ejector port at an axial end of a separator-ejector chamber of the system radially outward from said outlet.

* * * * *